United States Patent [19]

Harteck

[11] 4,308,246
[45] Dec. 29, 1981

[54] FIXATION OF NITROGEN USING SILICON OXIDE CATALYSTS

[75] Inventor: Paul Harteck, Troy, N.Y.

[73] Assignee: Rensselaer Polytechnic Institute, Troy, N.Y.

[21] Appl. No.: 226,592

[22] Filed: Jan. 21, 1981

Related U.S. Application Data

[63] Continuation-in-part of Ser. No. 76,377, Sep. 17, 1979, Pat. No. 4,271,137.

[51] Int. Cl.$^3$ .................. C01B 21/48; C01F 11/38
[52] U.S. Cl. .................................... 423/395; 423/400; 423/402; 423/404
[58] Field of Search ............... 423/395, 400, 402, 404

[56] References Cited

U.S. PATENT DOCUMENTS

| | | | |
|---|---|---|---|
| 1,348,227 | 8/1920 | La Cour | 423/400 |
| 1,945,415 | 4/1934 | Kipper | 423/395 |
| 4,271,137 | 6/1981 | Harteck | 423/395 |

Primary Examiner—Earl C. Thomas
Attorney, Agent, or Firm—McGlew and Tuttle

[57] ABSTRACT

A process for the fixation of nitrogen comprising, combining a gaseous nitrogen and oxygen at a total pressure of above 100 atmospheres with a solid oxide which can produce a nitrate, in the presence of an oxide of silicon catalyst for the acceleration of a reaction between nitrogen and oxygen to produce nitrogen oxides, initially heating the combination to a temperature of between 600° C. to 800° C. and below the dissociation pressure of the nitrate to start an exothermic reaction for producing nitrogen oxides from the nitrogen and oxygen and for producing nitrate from the solid oxide and to establish an equilibrium between the nitrogen, oxygen, nitrogen oxides, solid oxide and nitrate. The reacting combination in equilibrium is then cooled and either the nitrate or the nitrogen oxides are removed from the reaction as products.

15 Claims, 3 Drawing Figures

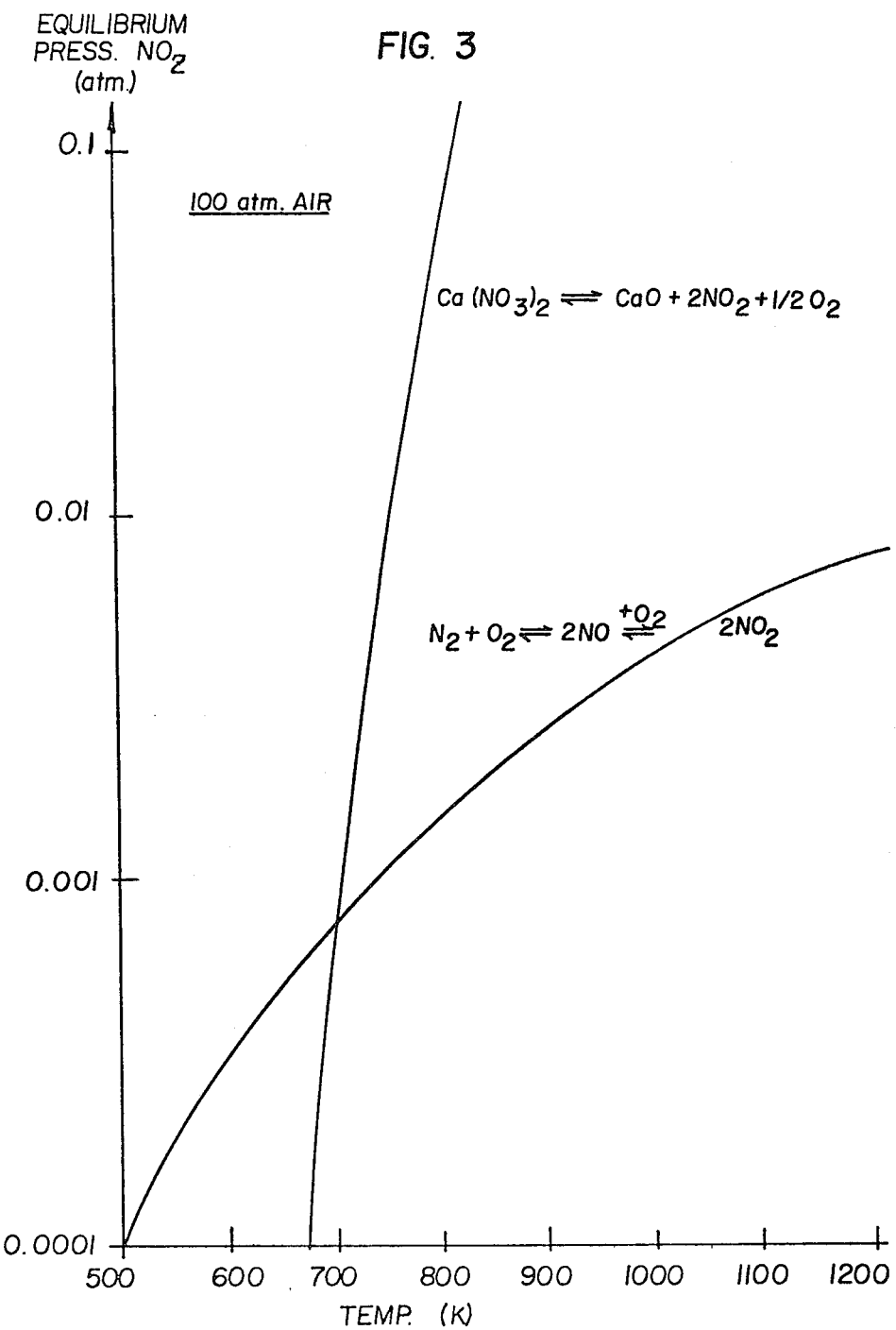

FIXATION OF NITROGEN USING SILICON OXIDE CATALYSTS

CROSS REFERENCE TO RELATED APPLICATIONS

This application is a continuation-in-part of the inventor's previous application having Ser. No. 076,377 filed Sept. 17, 1979 which was matured into U.S. Pat. No. 4,271,137.

FIELD AND BACKGROUND OF THE INVENTION

The present invention relates in general to the fixation of nitrogen and, in particular, to a new and useful process for the fixation of nitrogen and oxygen to form nitrogen oxides and a nitrate of a solid oxide.

Nitrogen fixation in general is the utilization of atmospheric nitrogen to form chemical compounds. In nature, nitrogen fixation is formed by bacteria located on the root hairs of plants. Industrial nitrogen fixation is exemplified by the production of ammonia using a gaseous mixture containing hydrogen and nitrogen.

The fixation of nitrogen using an alkaline earth metal is known from French Pat. No. 798,224 to Basset. This patent discloses the use of a nitrogen and oxygen mixtures of gases at high temperatures and pressures in the presence of an alkaline earth to form the nitrate of the alkaline earth metal. A similar process is disclosed in U.S. Pat. No. 1,954,415 to Kipper which utilizes temperatures of about 1,000° C. and pressures of 100 atmospheres or higher to produce the nitrates in the presence of a catalyst. A deficiency of these references, however, is that they do not provide for a cycling of the process and must in all cases elevate the temperatures to the operating temperatures of the reaction and maintain that temperature to yield the results disclosed. The methods and reactions disclosed are not suitable for commercialization due to these inadequacies.

Until the early 1940's, the thermodynamics of the nitrogen fixation process were not known. Only in the early 1950's did the thermodynamics become common knowledge in the field. The dissociation of nitrates into nitrogen oxides and the corresponding equilibrium with nitrogen and oxygen were known however, semiquantitatively. The above identified French reference which predated the clear understanding of the thermodynamics of the nitrogen fixation process, describes a reverse process to the dissociation of nitrate and corresponds to the formation of nitrate at high pressures and temperatures.

Other non-anticipating references which are of interest in considering this invention are U.S. Pat. No. 2,578,674 to Daniels et al. for a Nitric Oxide Recovery System, U.S. Pat. No. 3,333,923 to Leatham et al. for a Method For Producing Nitric Oxide, and U.S. Pat. No. 3,911,081 to Maness et al. for the Catalytic Oxidation of Nitric Oxide in Molten Salt.

The fixation of nitrogen has important industrial uses and, while in general utilizing air, the process remains relatively inefficient and expensive.

SUMMARY OF THE INVENTION

The present invention takes advantage of the thermodynamic equilibrium between nitrogen and oxygen which produces nitrogen oxides, such as nitric oxide and nitrogen dioxide, and solids which produce nitrates depending on the temperature and pressure conditions prevailing. Although nitrogen and oxygen are major constituents of air so that air can be used as the reaction mixture, the equilibrium provides acceptable yields of the nitrogen oxides only at very high temperatures. By providing conditions which tend to establish this equilibrium, and by providing solid metal oxides which are capable, in reactions with the gases, of producing nitrates, the solids have been found to actively extract fixed nitrogen in the form of nitrogen oxides, from the gaseous equilibrium to efficiently produce high yields of the nitrate. The nitrates may then be used in various ways, as an intermediate. Since the fixation of nitrogen from a mixture of nitrogen and oxygen is normally slow, a catalyst is also provided which is separate from the metal oxide and has been found to advantageously be an oxide of silicon. Such catalyst includes the quartz wool lining of the reaction vessel for the process, silica, such as sea sand and the like.

In general the overall reaction is isothermal so that only initial heating is required to start the reaction. Care must be taken, however, to prevent an overheating of the reaction above the dissociation pressure of the nitrate in the reaction which would reduce yields of the nitrate. At the same time, the temperature must be kept sufficiently high to optimize the production of the nitrate. The apparatus used for practicing the invention should maintain a minimum of heat loss so that only initial heating is required. Since the reaction takes place most favorably at pressures of above 100 atmospheres and preferably as high as 1,000 atmospheres, the initial heating may be accomplished simply by compressing the nitrogen and oxygen to these high pressures. Where necessary the apparatus may be provided with auxiliary heaters or coolers to maintain the reaction at its operating pressure and operating temperature. For the extraction of nitrates, the temperatures may be reduced somewhat to favor one side of the equilibrium reaction described hereinafter. The pressure will correspondingly change so that product can be extracted from the cycling reaction at what will be termed a product temperature and pressure. The range between the working and product temperature is preferably 100° C. or less and this is possible due to the isothermal character of the overall reaction.

Accordingly, an object of the present invention is to provide a process for the fixation of nitrogen comprising, combining gaseous nitrogen and oxygen at a total pressure above 100 atmospheres and at a working pressure range, with a solid metal oxide, at least initially heating the combination to a working temperature range sufficient to form a nitrate and below the dissociation pressure of the formed nitrate which corresponds to the working temperature range and the working pressure range, the nitrogen and oxygen reacting to form nitrogen oxides and the nitrogen oxides and solid metal oxide reacting to form nitrate with the overall reaction being substantially isothermic, changing the working pressure and temperature to a product pressure and temperature for increasing the yield of nitrate with the change being within 100° C., extracting the yielded nitrate from the reaction combination to leave a remaining reaction combination, adding additional solid metal oxide nitrogen and oxygen as needed to replace that consumed to the remaining reaction combination, and changing the product pressure and temperature back to the working pressure and temperature to repeat the reactions.

A further object of the present invention is to provide an apparatus for practicing the inventive method which includes containers for containing the catalyst which accelerates the nitrogen-oxygen to nitrogen oxides reaction, a second container connected to the first mentioned container for introducing the solid oxide and removing the produced nitrate, and a cycling circuit connected to the containers for recycling the resulting gases for the fixation of additional nitrogen therein.

A still further object of the present invention is to provide a method which produces nitrogen fixation at high efficiency and with high yields.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a graph showing the temperature dependence of the equilibrium dissociation pressure of nitrogen dioxide for calcium nitrate plotted with the pressure of nitrogen dioxide in equilibrium with air both at 100 atmospheres.

DESCRIPTION OF THE PREFERRED EMBODIMENTS

A typical reaction for the invention is:

$$N_2 + O_2 + solid \rightarrow solid\ nitrate \quad (1)$$

A specific example of the overall reaction using strontium oxide as the solid is:

$$N_2 + 5/2 O_2 + SrO \rightarrow Sr(NO_3)_2 \quad (2)$$

In greater detail, the reaction first involves the establishment of conditions which tend to form an equilibrium between the nitrogen and oxygen on the one hand and nitrogen oxides on the other hand. The reaction of nitrogen and oxygen to form the nitrogen oxides is enhanced by a catalyst and the best catalyst has been found to be silicon dioxide containing material. The equilibrium reaction is:

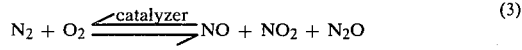

$$N_2 + O_2 \underset{}{\overset{catalyzer}{\rightleftharpoons}} NO + NO_2 + N_2O \quad (3)$$

In the example using the strontium oxide, this solid oxide will combine with the nitrogen dioxide to form the strontium nitrate under the proper chemical conditions according to the following:

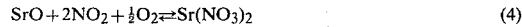

$$SrO + 2NO_2 + \tfrac{1}{2}O_2 \rightleftharpoons Sr(NO_3)_2 \quad (4)$$

The establishment of conditions which tend to form an equilibrium between the gas mixture including the solid oxide and the nitrate requires a temperature range high enough to efficiently produce the nitrate at high yields but still lower than the dissociation pressures of the nitrate. This requires a temperature of between about 600° C. to 800° C. To maintain this temperature, the reactive mixture is first heated and then the reaction must either be heated or cooled depending on the conditions prevailing thereafter. It is usually advantageous to provide one high pressure step of between 100 to 1,000 atmospheres or even higher if attainable with a cycling of chemicals during high pressures only.

The inventive method provides a high conversion efficiency for the gas mixture which is advantageously an air type mixture or air.

Figure 1:
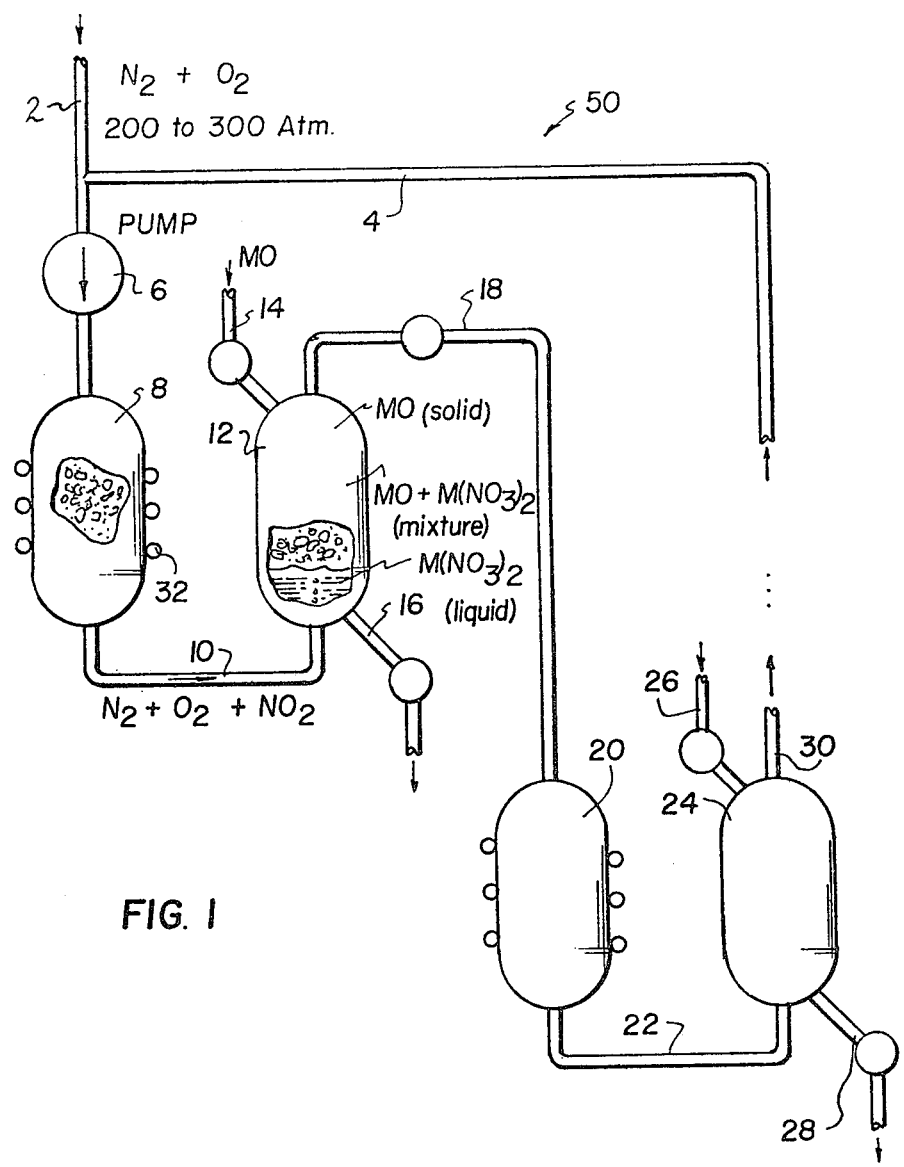
FIG. 1 is a schematic representation of one possible apparatus used for the fixation of nitrogen in accordance with the invention.

Turning to the drawing, FIG. 1 shows an apparatus for the fixation of nitrogen generally designated 50 having a gas inlet port 2 for the introduction of nitrogen and oxygen under a pressure of between about 200 to 300 atmospheres into a circulating line or conduit 4. The gaseous mixture which may be air is circulated by a compressor or circulation pump 6 to a catalyst chamber 8 which contains a catalyst such as quartz wool, or some oxide of silicon which enhance the production of nitrogen oxides from the nitrogen and oxygen mixture. The resulting gaseous combination having nitrogen, oxygen and nitrogen oxides (here shown as nitrogen dioxide) is conducted through a line 10 to a reactive solid chamber or solid oxide chamber 12. In the example shown, the solid oxide is provided through an oxide inlet 14 to the chamber 12. The oxide is here shown as an alkaline earth where M is an alkaline earth element or metal such as calcium, barium or strontium.

In chamber 12, the gaseous mixture in equilibrium and the metal or solid oxide reacts to form nitrate of the metal which, in its liquid state can be removed from the reaction through an outlet line 16. The remaining gaseous mixture is supplied through a line 18 to a second catalyst chamber 20 for the further production of nitrogen oxide. The resulting gaseous mixture is provided through a line 22 to a second solid oxide chamber 24 where additional solid oxide is supplied through an inlet 26. From this chamber additional nitrate is removed through an outlet 28 and the resulting gaseous mixture is supplied through an outlet 30 either to additional catalyst and oxide chambers connected in series or to the circulating line 4.

Each of the chambers may selectively be heated by suitably provided heating means, for example, heating coils 32 to enhance the reaction of nitrogen and oxygen to form the nitrogen oxides and of the solid oxide with the nitrogen oxides to form the nitrates. Since the overall reaction is substantially isothermic, having exothermic portions and endothermic portions, the initial heating may be accomplished by solar heating. The heating may be accomplished merely by establishing the high pressure environment for the nitrogen and oxygen initially which would automatically heat the combination to its operating temperature range.

Other examples of the inventive method can be carried out by charging a reactor or reaction chamber with the solid oxide that forms the nitrate, the catalyst, nitrogen and oxygen in the desired quantities. This reactor may be then heated to the desired temperature for optimizing the rate of nitrate production but still below the dissociation pressure of the nitrate. The reactor is then cooled and the nitrate recovered as the fixed nitrogen.

Alternatively, the reactor may be charged as above but at the completion of the nitrate formation, the fixed nitrogen oxides in the gas phase may be removed, for example by heating and/or by lowering the pressure. The nitrogen oxides may then be converted to nitric acid or other desired end products. The system may then by recycled as desired for additional reactions. This chemical sequence corresponds to:

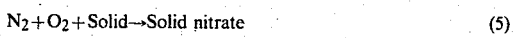

$$N_2 + O_2 + \text{Solid} \rightarrow \text{Solid nitrate} \quad (5)$$

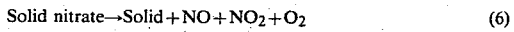

$$\text{Solid nitrate} \rightarrow \text{Solid} + NO + NO_2 + O_2 \quad (6)$$

The relatively slow decomposition of the nitrogen oxides to nitrogen and oxygen permits this recovery.

In a still further example of the invention, the reactor is charged as with the first example. Under certain conditions, however, the nitrates which are formed will be at a temperature above their melting point. This is the situation in the example shown in FIG. 1. The liquid nitrate is then removed from the system and recovered as a product with the remaining gases being recycled after decomposition to produce the nitrogen oxides as described in the second example above.

Also as shown in FIG. 1, the chambers or reactors containing the catalyst may be separated physically from those containing the reactive solid. The oxygen and nitrogen mixture may then circulate at the desired temperatures and pressures to produce a continuous process.

In a specific experiment for the fixation of nitrogen, equation (3) above was run with oxygen at about 400 atmospheres, nitrogen at about 400 atmospheres, and a temperature of 727° C. Under these conditions, the pressure of nitric oxide was found to be 0.05 atmospheres and the pressure of nitrogen dioxide was found to be 0.2 atmospheres. Under these conditions, the dissociation pressure of nitrogen dioxide is 0.07 atmospheres and therefor the strontium nitrate $Sr(NO_3)_2$ will be formed from the provided strontium oxide (SrO). For the release of nitrogen dioxide from the reaction, the total pressure is reduced from about 800 atmospheres to about 1 atmosphere. Since according to the dissociation reaction (4), the nitrogen dioxide pressure is reversely proportional to the fourth power of oxygen, or increases by about a factor of 8 to at least 0.5 atmospheres, an increase of the temperature by about 50° will increase the dissociation pressure to a few atmospheres. The nitrogen dioxide and oxygen liberated will react with water according to the exothermic reaction:

$$2NO_2 + \tfrac{1}{2}O_2 + H_2O \rightarrow 2HNO_3(conc.) - 14 \text{Kcal.} \quad (7)$$

The formation of $Sr(NO_3)_2$ from $SrO + N_2 + 5/2O_2$ is exothermic with 92 Kcal. formed. The dissociation of $Sr(NO_3)_2$ into $SrO + 2NO_2 + \tfrac{1}{2}O_2$ is endothermic with 108 Kcal. formed.

Another consideration is that since the temperature is below 727° C., the use of solar energy becomes economic.

Figure 2:
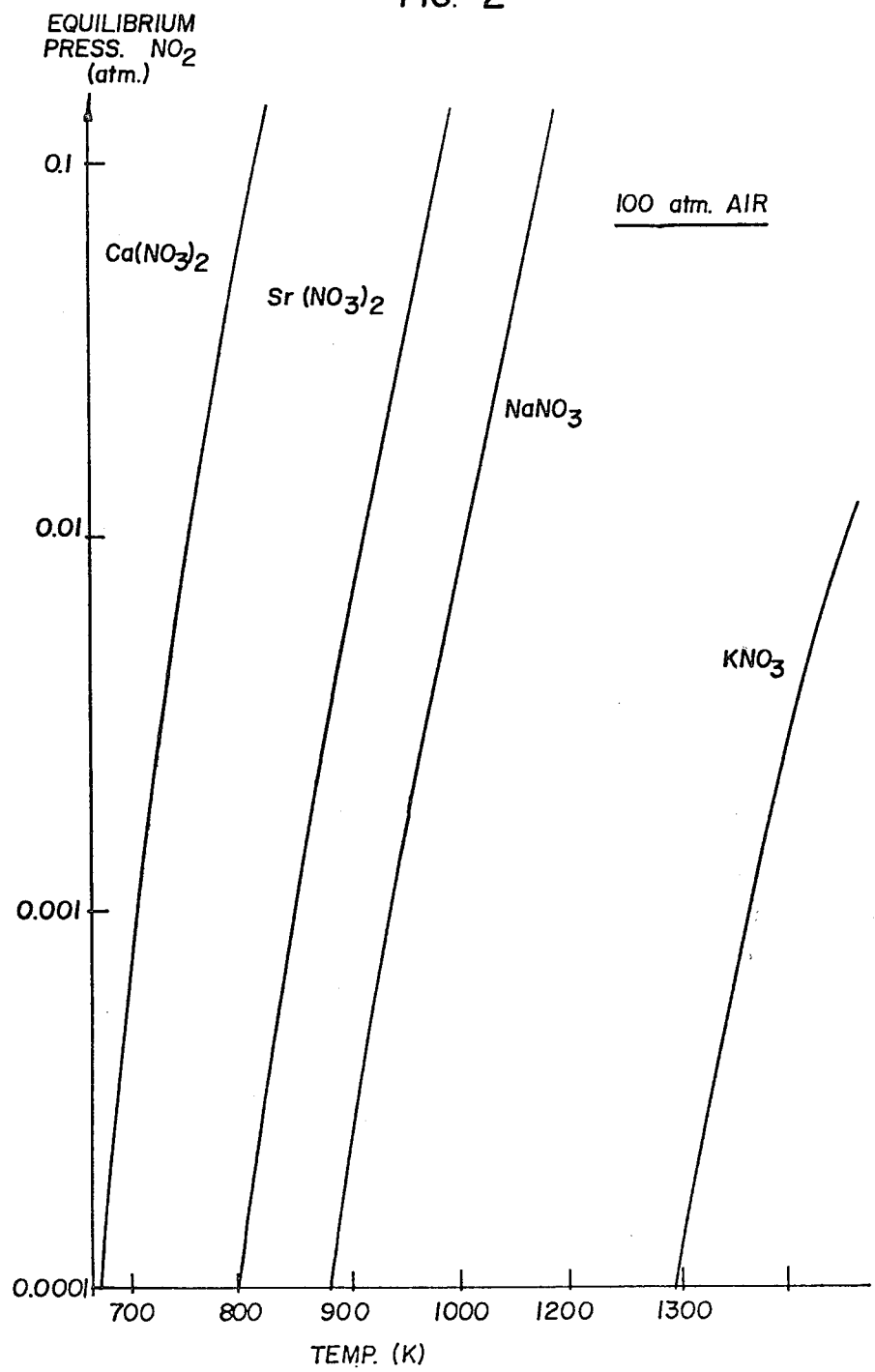
FIG. 2 is a graph showing the temperature dependence of the equilibrium dissociation pressure of nitrogen dioxide for various nitrates and 100 atmospheres of air.

Referring now to FIGS. 2 and 3, it is seen that the equilibrium dissociation pressure of nitrogen dioxide is dependent on temperature and also on the type of nitrate to be formed. FIGS. 2 and 3 show the reaction at 100 atmospheres but it is preferable that this working pressure be even higher. Nitrogen dioxide is shown used with the nitrate since the partial pressure of the nitrogen dioxide formed in the reaction is substantially greater than that of nitric oxide (NO). The temperature is shown in degrees Kelvin. In FIG. 2 alkali metal nitrates are also shown, that is the sodium and potassium practicing the invention then the alkaline earth metal nitrates.

In FIG. 3, the example is shown using calcium nitrate as a product. By varying the conditions from the working temperature and pressures to the product temperature and pressures the nitrate formation can be maximized and the nitrate extracted. Since the reactions overall are isothermic, the temperature may be varied within a 100° C. range to produce the nitrate product in good yields. By cycling and recycling the constituents of the reacting combination and adding additional solid oxide, nitrogen and oxygen as needed, an efficient fixation of nitrogen is produced. The alkaline metal oxides are also chosen due to their relatively high melting point since these oxides should be in solid form in the reaction.

In the parent application favorite catalysts included oxides of cobalt, nickel and copper. Platinum was also mentioned but is too expensive to be practical. All of these catalysts however have a relatively limited lifetime. It is preferable that a catalyst should have a lifetime on the order of one or more years. It has been discovered that near 1,000° K. the walls of a quartz vessel catalyze the decomposition of NO or $NO_2$ in a measurable way. For this reason, quartz wool was used as a catalyst to form nitrogen at 800° C. and one atmosphere pressure. Quartz wool has been found to be quite effective as the catalyst. Quartz wool being predominantly made of silicon dioxide, can be substituted by much more inexpensive catalysts such as silica, particularly in the form of sea sand. Different mineral fibres might also be used as the catalyst. The selection of a proper mineral fibre catalyst can possibly increase the rate of nitrogen formation proportional to 3/2 power of the pressure utilized.

The use of readily available and inexpensive silicon dioxide, particularly in the form of sea sand further renders this process extremely economical for the production of nitrogen compounds particularly for use as fertilizers in areas that need it most. For example, desert country which is known to have an abundance of sand, is particularly attractive for the process due to its equally abundant heat source, the sun and air as the source of nitrogen and oxygen.

While specific embodiments of the invention have been shown and described in detail to illustrate the application of the principles of the invention, it will be understood that the invention may be embodied otherwise without departing from such principles.

What is claimed is:

1. A process for the fixation of nitrogen comprising: combining gaseous nitrogen and oxygen at a total pressure of above 100 atmospheres and at a working pressure range, with a solid metal oxide in the presence of an oxidized silicon catalyst; initially heating the combination to a working temperature range sufficient to form a nitrate and below the dissociation pressure of the nitrate corresponding to the working temperature and pressure ranges: the nitrogen and oxygen reacting to form nitrogen oxides and the nitrogen oxides and solid metal oxide reacting to form the nitrate with the overall reaction being substantially isothermic; thermally insulating the reaction to maintain the working temperature range; the temperature range being near thermal equilibrium for the nitrogen and oxygen oxides reaction; extracting the nitrate from the reacting combination to form a product of nitrate and to leave a remaining reacting combination; and adding additional solid metal oxide nitrogen and oxygen as needed to replace that consumed to the remaining reaction combination.

2. A process according to claim 1, wherein the solid metal oxide is chosen from the group consisting of an oxide of calcium, strontium and barium.

3. A process according to claim 1, wherein the total initial pressure of nitrogen and oxygen is between 100 and 1,000 atmospheres and the nitrate formation occurs with low energy consumption or energy formation.

4. A process according to claim 1, wherein the working temperature range is between 600° C. and 800° C.

5. A process according to claim 1, wherein said initial heating is partly achieved by compressing the nitrogen and oxygen gases to the total pressure of above 100 atmospheres.

6. A process according to claim 1, wherein the gaseous nitrogen and oxygen, the catalyst and the solid oxide are combined in a common reactor, at the completion of nitrate formation, the fixed nitrogen as the nitrogen oxides in a gas phase is removed by heating and reducing the pressure.

7. A process according to claim 6 further including converting the nitrogen oxide into nitric acid by adding water.

8. A process according to claim 1, wherein the gaseous nitrogen and oxygen the catalyst and solid oxide are combined in a common reactor to form a liquid nitrate, and the liquid nitrate is removed as the product.

9. A process according to claim 8, wherein the removed product is recycled and decomposed in the reaction to produce nitrogen oxides as the product.

10. A process according to claim 1, wherein the gaseous nitrogen and oxygen are combined in the presence of the catalyst to form the nitrogen oxides in a separate reactor, and a resulting mixture in equilibrium of nitrogen, oxygen and the nitrogen oxides in provided to a second chamber containing the solid oxide which is elevated to a temperature of between 600° C. to 800° C.

11. A process according to claim 1, wherein the gaseous nitrogen and oxygen, the catalyst and the solid oxide are combined in a common reactor and the common reactor is heated to give an optimum rate of production of the nitrate, the reactor then being cooled and the nitrate removed as the fixed nitrogen.

12. A process according to claim 1, utilizing air to provide the gaseous nitrogen and oxygen.

13. A process according to claim 1, wherein the catalyst is quartz wool.

14. A process according to claim 1, wherein the catalyst is silica.

15. A process according to claim 14, wherein the catalyst is sea sand.

* * * * *